Sept. 7, 1943.  W. H. VENABLE  2,328,935
WEIGHING APPARATUS
Filed July 26, 1939  2 Sheets-Sheet 1

INVENTOR
William H. Venable
by his attorneys

Sept. 7, 1943.   W. H. VENABLE   2,328,935
WEIGHING APPARATUS
Filed July 26, 1939   2 Sheets-Sheet 2
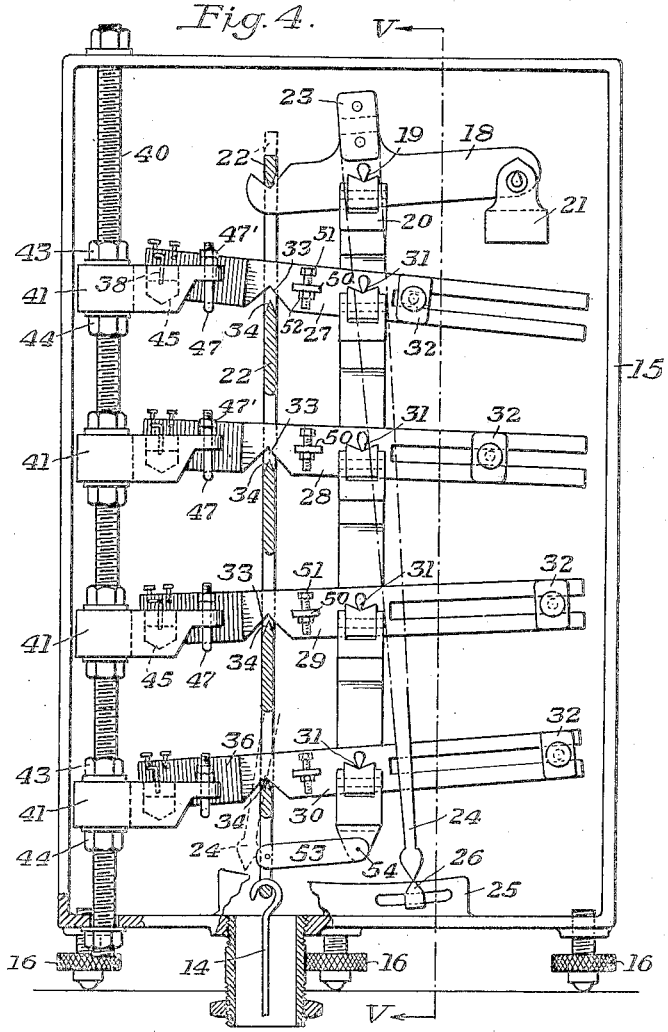
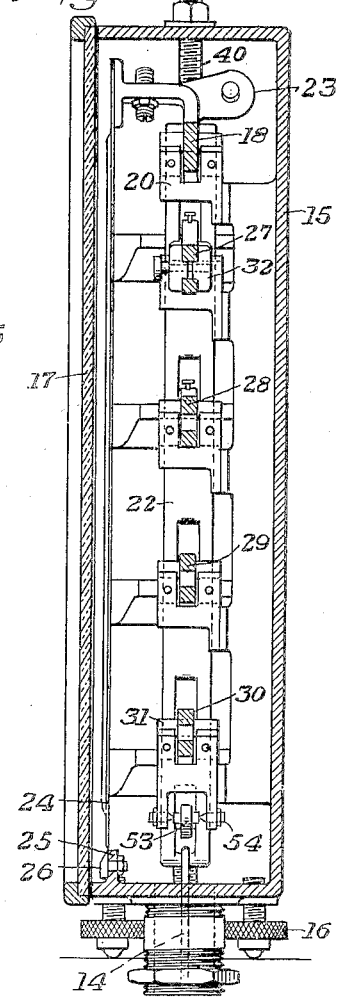
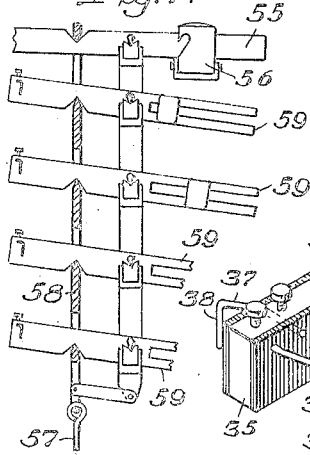
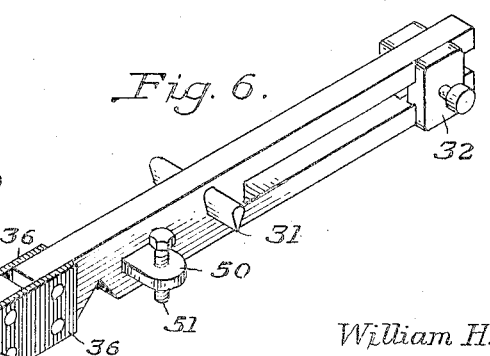
INVENTOR
William H. Venable
by his attorneys

UNITED STATES PATENT OFFICE 2,328,935

WEIGHING APPARATUS

William H. Venable, Pittsburgh, Pa., assignor to Blaw-Knox Company, Blawknox, Pa., a corporation of New Jersey Application July 26, 1939, Serial No. 286,617

10 Claims. (Cl. 265—58)

This invention pertains particularly to weighing apparatus and is for a contact device and indicator for use with weighing apparatus. The invention provides an electric circuit-closing apparatus for use in connection with weighing devices which is operated by the scale in such manner as to oppose a minimum load or resistance to the operation of the scale.

The invention is particularly designed for use with scales of the type having a beam where the movement of the beam under the load being weighed is opposed by a counterpoise and where the beam must be free to move with a minimum resistance to a position of equilibrium, but the invention is also applicable for use with scales of other types and in other apparatus where it is desirable to utilize the deflection of a movable arm to close or open electrical circuits in a positive and predetermined manner and with a minimum resistance to the deflection of such a movable member. I shall describe the invention particularly in connection with a weighing scale, but it will be understood that this is by way of illustration and not by way of limitation. The invention is particularly applicable for use with scale beams of the type used commercially in the weighing of bulk materials where the material is fed into a weighing receptacle or weigh hopper at a rapid rate until an amount somewhat short of the desired amount is obtained, and then, to avoid overfilling, at a slower rate until the desired amount is secured within certain pre-established tolerances. In connection with the weighing of large amounts of material, as for example the batching of the ingredients of a concrete mix or the mixing of large quantities of chemicals in industrial plants, material is fed into weigh hoppers in this way, and scale-operated contact devices have been employed to control the flow of different ingredients into a receiving hopper or to effect some indication or automatic operation to enable the charging of material into the hopper to be properly regulated.

In a weighing scale there is provided a pivoted scale beam having a movable counterpoise thereon at one side of the pivot point. The material being measured or a predetermined proportion of the weight of the material being measured is transmitted to the scale beam at the other side of the pivot point. The free end of the scale beam swings between an upper and a lower stop. As the weight of the material in the hopper increases, it will eventually reach a point where it begins to cause the free end of the scale beam to start to rise away from the lower stop. If the scale beam moves against the upper stop, there is an excess of material in the hopper over and above the amount necessary to balance the counterpoise. The scale beam should be brought to a position of balance substantially midway between the two stops at which time the exact amount of material is in the hopper. It has heretofore been proposed to use this movement of the scale beam to operate electrical contact apparatus, but the apparatus heretofore provided offers a resistance to the movement of the scale beam and disturbes the delicate condition of balance which must exist for the weighing of material within close limits of tolerance.

Frequently it is desirable to operate a succession of electrical contacts, and the present invention provides an apparatus wherein a plurality of contacts may be progressively operated according to the movement of the scale beam or other operating device with a minimum resistance to the movement of such scale beam or other operating device. The invention further provides an arrangement for the progressive closing of contacts which may be simply adjusted to meet the requirements of any particular installation.

According to the present invention there is provided a scale of any known or preferred construction having a weighing element which is moved by the load of material being weighed against a counterbalancing force with auxiliary means for applying a load to the weighing element which operates in conjunction with the material being weighed and in opposition to such counterbalancing force, together with means for relieving the weighing element of such auxiliary means after the weighing element has moved or has been deflected to a predetermined extent. Through this arrangement the movement of the weighing element under the influence of the material being weighed is momentarily halted until the effect of removing such auxiliary means from the weighing element has been compensated for by the flow of additional material into the weighing hopper of the scale. There may be one or more of these auxiliary elements, and at such times as it or they are effectively removed from the weighing element, the motion of such weighing element is interrupted. By having a series of such auxiliary means, the load of which is removed from the scale beam progressively at predetermined critical periods in the filling of the weigh hopper, the flow of material into the weigh hopper can be accurately predetermined and controlled, and the proper amount of material within very close tolerances may be assured.

My invention may be readily understood by reference to the accompanying drawings in which Figure 1 is a side elevation of a more or less conventional form of multiple scale beam box with my invention applied thereto;

Figure 4 is a front elevation of the contact device with the door of the housing removed;

Figure 5 is a transverse vertical section in the plane of line V—V of Figure 4;

Figure 6 is a perspective view of the contact beam of Figure 2;

Figure 7 is a somewhat schematic view showing a slight modification; and

Figure 1:
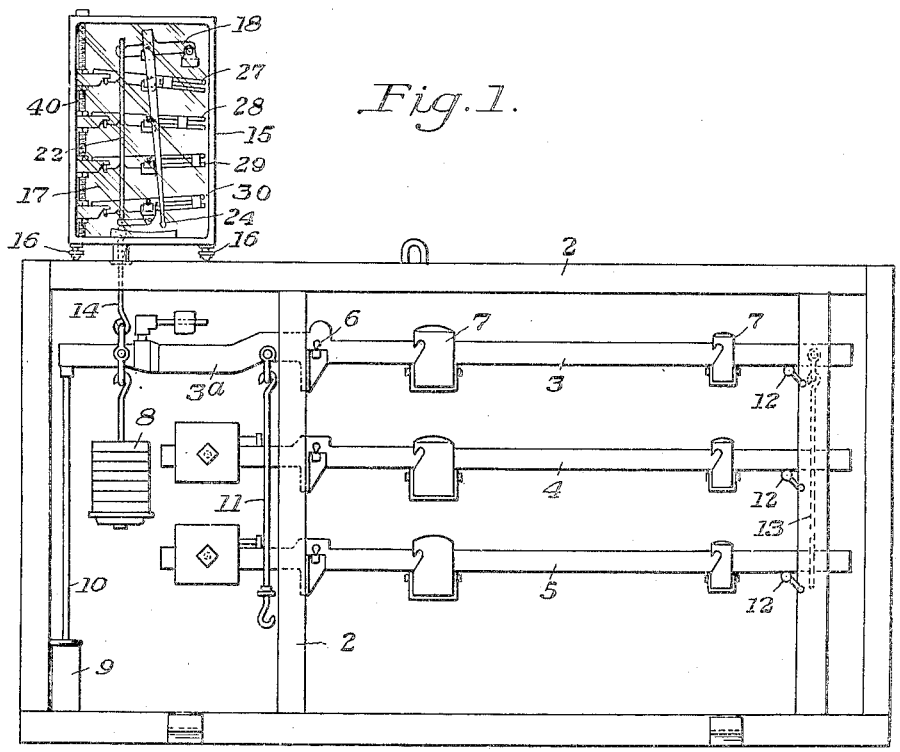

Referring to the drawings, 2 designates a scale beam box. In the drawings the scale is illustrated as being of the multiple beam type in which the uppermost beam 3 is the master beam and the beams 4 and 5 are secondary beams. Scales of this type are frequently used in batching operations such as the preparation of concrete batches, and the construction and general arrangement of the scale beam box forms no part of the present invention. The master beam 3 is pivotally supported on scale beam bearings at 6. One or more counterpoise weights 7 are mounted on one end of the beam, and secured to the other end 3a of the beam is a fixed counterweight 8. Means such as a dashpot 9 with a piston rod 10 is attached to the end 3a of the scale beam for damping the free oscillation of this beam. The weight which operates the beam is applied to the beam close to the fulcrum 6 through a link 11, the connections from the link 11 to the weighing hopper not being shown and forming no part of the present invention.

The arrangement is such that as the load on the scale or scale hopper is increased, an increasing tension is applied to the rod 11 and when sufficient tension is applied to rod 11, the scale beam end 3a will start to move down, the opposite end of course moving up. Through the use of trigs 12 and a ladder 13, the secondary beams 4 and 5 may be operated in conjunction with the master beam.

All of the apparatus heretofore described forms no part per se of the present invention. Connected at one end of the master scale beam as for example the left-hand end as viewed in Figure 1, there is a link 14 from which motion is transmitted from the scale beam to a scale beam indicator and circuit-closing apparatus. This apparatus may be positioned at any suitable or convenient point. It is illustrated as being mounted directly on top of the scale beam box. It comprises a casing 15 having three vertically adjustable feet 16 by means of which it can be set in a level position. The casing 15 may be provided with a glass door 17 through which the movement of the indicator arm hereinafter described may be observed but which serves to protect the apparatus from dust and dirt.

Within the box 15 adjacent the top thereof is a beam 18 supported at 19 on scale beam bearings, there being a fixed bearing support 20 within the housing 15. Hung from one end of the beam 18 is a counterweight 21. Hung from the other end of the beam is a ladder 22. The lower end of the ladder is connected to the link 14 so that motion from the master scale beam may be transmitted through the link 14 and ladder 22 to the beam 18. The beam 18 has a forwardly projecting arm 23 thereon, and secured to this arm is a long pointer 24 the end of which terminates adjacent a scale 25 in the bottom of the housing. Preferably the beam 18 with pointer 24 attached but without weight 21 or ladder 22 hanging thereon is perfectly balanced about pivot 19 for all positions of the pointer. The scale 25 may be provided with an adjustable indicator 26. The movement of the beam 18 causes the pointer 24 to oscillate along the scale 25 and the indicator 26 is adjusted to such a position that when the pointer is exactly opposite it, the correct amount of material will be in the scale hopper. In Figure 4 the parts are shown in the position which they assume at just the moment when the correct amount of material is in the scale hopper. The dotted line position of the pointer shows the position which the pointer assumes before the master scale beam has started to move under the influence of material being loaded into the hopper. These parts so far described do not modify the behavior of the weighbeam in any way, but serve principally as a means for applying other instrumentalities, presently to be described, to the weighbeam and to provide a magnified indication of the position assumed by the weighbeam.

Below the beam 18 are one or more circuit-closing beams, four of which are shown in the present disclosure. These beams which are all of like construction, are numbered 27, 28, 29 and 30 in the order of their height from top to bottom. Each of the beams 27 to 30 inclusive is supported on a scale beam bearing at 31. Each beam preferably has one end slotted to receive an adjustable counterpoise 32. The opposite end of each beam is provided with a notch 33 on the lowermost edge thereof for engagement with a knife edge cross member 34 on the ladder 22, the ends of the beams projecting through the openings in the ladder. Secured to the left-hand end of each of the beams 27 to 30 inclusive as viewed in Figure 4 is a contact element comprising a metal block 35 carried between insulating strips 36 which insulating strips are secured, as best shown in Figure 6, to the end of the beam on which the block is carried so that the block 35 is insulated electrically from the beam on which it is mounted, but is rigidly supported on such beam and forms, in effect, an extension of such beam. Extending laterally from the block 35 are contact wires 37 having downwardly turned terminal portions 38.

Figure 2:
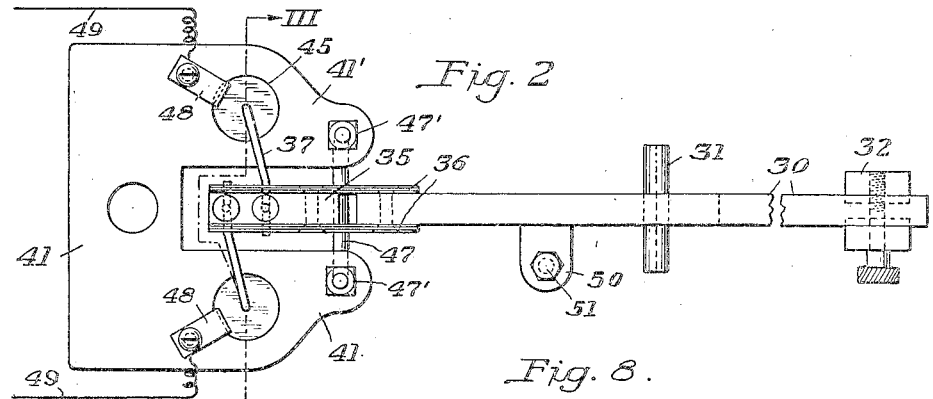
Figure 2 is a top plan view of one of the circuit-closing beams and the mercury cup unit with which said beam cooperates.
Figure 3:
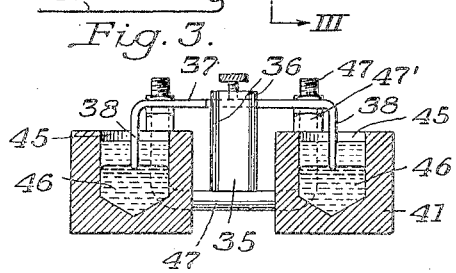
Figure 3 is a transverse section through the mercury cup unit, the section being in the plane of line III—III of Figure 2.

Extending from the top to the bottom of the housing is a threaded supporting post 40. Mounted on the post 40 are blocks 41 of insulating material. These blocks are confined between nuts 43 and 44 on the post, and by adjusting the nuts 43 and 44 the elevation of the several blocks may be adjusted. Each of the blocks 41 is bifurcated as best shown in Figure 2 to provide parallel arm portions 41'. Each of the arm portions 41' is provided with a well 45 to receive and hold a body of mercury 46 (see Figure 3), and if desired, oil may float on top of the mercury to prevent oxidation thereof.

There is one of these blocks 41 for each one of the circuit-closing beams 27 to 30 inclusive. Each block is set at a predetermined height with reference to the contact beam with which it is to cooperate, and the bifurcation in each block provides a clearance space through which the left-hand end portion of the contact may extend so as to lie between the two arms 41'. Carried on the outer end of the arms 41' of each block is a U-shaped bolt or yoke member 47 the upper ends of which pass through the arms 41' and have nuts 47' thereon. By adjusting the nuts 47', the yoke members 47 may be raised or lowered. These yoke members 47 provide stops to limit the downward movement of the respective contact beams with which they cooperate. By reference to Figure 4, it will be noted that when the parts are in the position shown in that figure, the ends of the uppermost three arms, 27, 28 and 29, are all resting on the respective stop members 47 so that the left-hand ends of these beams cannot move downwardly any further than the position shown even though the ladder has dropped clear of these beams and no longer provides support for them. In Figure 4 only the lowermost beam 30 is above its stop 47 and remains supported on the ladder.

Figure 8:
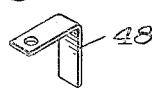
Figure 8 is a detailed perspective view of one of the terminal fingers that dips into the mercury cups.

The arrangement of the mercury cups 45 and the contact wires 37—38 is such that when the contact levers 27 to 30 inclusive are resting on the stop elements 47, the terminal portions 38 of the wires will dip into the mass of mercury 46 within the cups 45. Secured alongside each cup 45 on each block member 41 is a terminal member 48 (shown in detail in Figure 8) to which an electric lead wire 49 may be attached and which dips down into the mercury in the cup adjacent which it is mounted. When a contact beam is in its lowermost position, i. e., when it is resting on its stop member 47 so that the wires 37—38 are dipping into the mercury, a circuit can be completed from one wire 49 through terminal 48 and the mercury to one of the contact wires 37—38 into the metal block 35 and from the metal block 35 through the other contact wire 37—38 into the other mercury cup to the other terminal 48 and out the other wire 49. Thus by raising and lowering the contact beams 27, 28, 29, and 30, circuits may be opened and closed, and by proper vertical positioning of the several blocks 41 and by proper adjustment of the counterweights 32, the several beams may cause the progressive opening or the progressive closing of circuits, the order of the closing of the circuits being determined by the adjustments of the several blocks 41 with relation to each other and with relation to their respective contact beams.

Extending out from the side of each one of the contact beams 27 to 30 inclusive, is a lug 50 into which is threaded a vertical bolt 51 which may be provided with a lock-nut 52. By raising the bolt 51, the center of gravity of the beam may be raised or lowered. Through the adjustment of this bolt, the center of gravity of the beam may be raised above a line longitudinally through the beam in the plane of its pivotal support or below such line. If the center of gravity is below such line, gravity will act on the beam through a decreasing moment as the beam moves away from a horizontal position, and the beam will tend to rise to a point where its longitudinal axis is inclined upwardly to the left from a horizontal plane. On the other hand, if the center of gravity is above said line, gravity will act on the beam through an increasing moment when the beam is raised above a horizontal position and the beam will tend to move down so that its longitudinal axis is sloped in the opposite direction to a horizontal plane. This adjustment provided by the bolt 51 makes the sensitivity of the contact beams greater or less, and as hereinafter more fully pointed out this adjustment may be utilized to cause the beams to exert an increasing downward force after the downward movement of the beams has been initiated, due to the center of gravity being above the pivot.

A pivoted link 53 is shown adjacent the bottom of the ladder 22 and it is connected to the bottom of the ladder and to a fixed bearing at 54, the purpose of this link being to keep the ladder at all times vertical.

In setting up the device for operation it is of course necessary that the housing 15 be adjusted to a level position. The counterpoises 32 on the several contact beams are then individually adjusted. By means of the adjustment of these counterpoises the amount or portion of the total weight of the contact beam and those parts attached to it which rests upon the ladder may be regulated. Referring to the uppermost beam 27, the counterpoise 32 is shown relatively close to the main supporting pivot. On the beams 28, 29, and 30, the respective counterpoises are progressively further out from the pivot point. If the contact beams are all alike, the weight imposed by the uppermost beam 27 on the ladder is greater than that from any of the other beams because of the position of the counterpoise closer to the pivot. In any event, however, some of the weight of each contact beam must rest upon the ladder when the ladder is in a raised position which is the normal position when there is no load on the scale and also the end of each contact beam must be supported on its respective stop element 47 when the ladder is in its lowermost position which is the position which it reaches when the scale hopper has been filled in excess of the amount desired. In setting up the apparatus, not only are the counterpoises 32 adjusted, but the blocks 41 are adjusted to a predetermined height on the supporting post 40 and the mercury cups are filled to a predetermined level.

In operation the ladder 22 is normally lifted from the position shown in Figure 4 to the dotted line position, in which position each of the contact beams 27, 28, 29, and 30 is raised above the position shown in Figure 4 and the contact wires 37—38 are clear of the mercury cups. In this position some of the weight of each contact beam assembly is bearing down on the ladder 22 so that at this time the sum of all of the weight applied to the ladder by the several contact beams forms a part of the counterweight system effective on the end 3a of the master scale beam 3. At this time the weights imposed by the several contact beam assemblies on the ladder are effective on the master scale beam in the same direction as the counterweight 8 and in the same direction as the pull of the weight in the scale hopper exerted through the link 11. Thus they provide auxiliary means acting in conjunction with the material being weighed for deflecting the scale beam against a counteracting force. When the material is loaded into the scale hopper in a sufficient amount, the pull on the link 11 will start to rock the master beam 3 causing the end 3a to move down. This downward movement of the end 3a of the master scale beam will be transmitted through the connection 14 to the ladder 22 pulling down on the left-hand end of the indicator beam 18 causing the indicator to start to swing toward the right as viewed in Figure 4. Also, as the ladder 22 moves down, the points of support for the several contact beams 27, 28, 29, and 30 move down allowing these several contact beams to start to swing downwardly. As the ladder moves down toward the position shown in Figure 4, the contact beams progressively move into circuit-closing position in which their respective contact wires 37—38 are immersed in the mercury in the respective wells, and the ends of the beams will progressively move into contact with their respective stops 47.

When the master scale beam starts to move, the most of the batch of material will have been delivered to the weighing hopper because the scale beam starts to move only when the loaded hopper imposes a certain desired predetermined weight less than the correct total weight, this difference being due to the reaction of beams 27, 28 and 29 on the ladder 22, and consequently on the weighbeam connected thereto. When the uppermost contact beam 27 engages its stop 47, the load of this contact beam will be taken off the ladder 22. This will have the same effect as very slightly decreasing the counterweight 8 so that before the scale beam will move any further to let the second contact arm 28 move into circuit-closing position, additional material has to be charged into the hopper to again put the scale beam into motion. After the first beam 27 has moved into contact with its fixed support and its weight has been relieved from the scale beam, additional material charged into the hopper will cause further deflection of the scale beam, rocking the second arm 28 to circuit-closing position and relieving the load of this second beam or arm from the scale beam. This will cause a second pause in the deflection of the scale beam. Additional material thereafter charged into the hopper will again put the scale beam into motion. It will move until the third contact arm 29 engages its stop 47 when the weight of the third contact arm assembly will be taken off the ladder 22. At this time the pointer 25 should be directly opposite the indicator 26 to show that the correct amount of material is in the hopper. In the position shown in Figure 4, if the scale beam continues to rock so that the contact beam 30 is in circuit-closing position, the pointer 24 will have moved to the right past the indicator 26 indicating an over-charge in the hopper. The device thus gives visible indication of the approaching true balance of the weighbeam not by continuous motion of the pointer as characterizes conventional indicators usually attached to weighbeams, but in definite steps separated by weight intervals established by the setting of the poises 32 as the movement of weighbeam 3 causes the contact beams 27, 28 and 29 and 30 to come to rest each in turn on stops, thereby relieving the weighbeam of a small increment of weight at each such action.

It will be seen that the contact apparatus operates with very little force and thereby offers no substantial or appreciable resistance to the free movement of the scale beam 3. In fact, if the screws 51 are adjusted so that the several contact arms are in unstable equilibrium when the available lifting force of the ladder 22 at a certain load in the hopper just balances the counterpoises 32 before the pointer begins to move, the effect of the apparatus is to accelerate the normal movement of the weighbeam 3, or in other words to improve its sensitivity at this particular loading.

The purpose of the electrical contacts in connection with the scale beam is not important to the present invention, but the progressive closing of these contacts may for example, be used to operate signals or controls at a remote point to change the rate at which material is being charged into the hopper. As a typical example, when there is no charge in the hopper and all of the contact beams are in their uppermost position, material may be charged into the hopper at a very fast rate. For example, if 2,000 pounds of material are to be measured out with a tolerance of 3 pounds plus or minus, 1,900 pounds of material may be rapidly fed into the hopper at which time the upper contact beam 27 will close a circuit either to automatically cut the feed of material down to a dribble feed or operate a signal through which the scale operator may cut down the rate of feed of material into the hopper to a dribble feed. The material then flows into the hopper in a very gradual amount until the second contact lever 28 closes a circuit. This circuit may shut off the feed of material automatically or operate a signal to warn the operator to cut off the feed of material. Usually after the feed of material has been cut off, there is a certain weight of material in the chute which conducts the material being weighed to the scale hopper, and the scale beam 28 is set to close its circuit sufficiently in advance of the full 2,000 pounds being reached so that by the time the material which is flowing toward the scale hopper has finally entered the hopper, the 2,000 pounds within the allowed tolerance will have been charged into the weighing hopper. Beam 29 would be set to make contact at 1,997 pounds and beam 30 to make contact at 2,003 pounds, these amounts being the maximum and minimum allowance with the given tolerance of three pounds. These contact beams in a typical installation would control a circuit to warn the operator that the batch was over or under weight, or to operate a lock preventing discharge of the hopper or adding other ingredients until the deficiency or excess had been corrected.

The adjustment provided by the vertically adjustable element 51 is of importance because it enables the center of gravity of the beam to be adjusted in such manner that as the left-hand end of the beam tips downward, a greater instead of a lesser weight will be borne by the ladder. The element 51 is so adjusted with reference to the adjustment and sensibility of the master beam that when the master beam is deflected sufficiently to initiate the descent of the contacting end of a circuit closing beam, further deflections of the beam will be easier instead of more difficult thus causing the contacts to enter the mercury in a positive manner and do away with the necessity for having an exceedingly fine adjustment of the elevation of the mercury and the position of the contact wires. I have found that by adjusting these beams in the manner described, the contact needles can be caused to drop suddenly into the mercury wells precisely at the desired critical loads which are established by the setting of the poises 32.

While Figure 1 illustrates the circuit closure as being applied as an attachment to a scale beam box, the circuit-closing device and indicator may be directly coupled to a scale beam as a part of the scale beam, as illustrated in Figure 7. In Figure 7, 55 designates a scale beam generally similar to the indicator beam 18 but having an adjustable counterpoise 56. The weight of material in the hopper is transmitted to one end of the scale beam 55 through a connection 57 at the bottom of the ladder 58. The contact beams, which are only schematically indicated in Figure 7 and which are numbered 59, engage with this ladder in the same manner that they do the ladder 22 of Figure 4. In this modification the beam 55 combines the function of the master beam 3 and the indicator beam 18 of the arrangement previously described, and the ladder 58 combines the functions of the ladder 22 and the connection 11 of the arrangement shown in Figure 1. In other words, the contact arms are operated directly from the scale mechanism and as a part of the weighing scale mechanism rather than as an attachment, but the same principles of operation apply.

From the foregoing description it will be seen that my invention contemplates the provision of auxiliary weights which are effective to apply a load to the scale beam or other weighing apparatus through a portion of the travel of such apparatus and which are automatically rendered ineffective during another part of the deflection or movement of the weighing apparatus to thus cause the movement of the weighing apparatus to be temporarily halted when the load reaches a predetermined amount short of the full load which it is desired to weigh out and it further provides an arrangement where such auxiliary weight means are utilized to control an electric circuit.

While I have described my invention particularly in combination with a scale beam, it will be appreciated that the circuit-closing apparatus could be operated from any lever or reciprocating part where it may be desired to effect closing or opening of one or more electric circuits as such lever or reciprocating part changes its position where weighing or force balancing is somehow involved in the process.

While I have illustrated and described certain specific embodiments of my invention, it will be understood that the invention may be otherwise constructed and embodied and that various changes and modifications may be made therein within the contemplation of the following claims.

I claim:

1. An indicating and circuit-control attachment for a scale beam, comprising a fixed supporting structure, an unbalanced lever pivotally carried on said structure, a ladder for pivotal attachment at one end to a scale beam and for supporting the unbalanced lever against free motion and in such manner that the force of the unbalanced lever on the ladder is exerted in the direction of the load being weighed, and a fixed stop in the path of movement of the lever and positioned to limit the range of free movement thereof during the weighing operation to an extent less than the movement of the ladder whereby after predetermined deflection of the scale beam the lever is held by said stop from further movement, and cooperating electric contact elements on said lever and stop, said attachment being so positioned with respect to the scale beam to which it is applied that the distance from the ladder to the fulcrum of the scale beam is greater than the distance from the ladder to the pivot point of the unbalanced lever, whereby the lever and scale beam move at different angular velocities.

2. An indicating and circuit-closing attachment for a scale beam comprising a fixed supporting structure, an unbalanced lever pivotally carried on said structure, a ladder for pivotal attachment to one end of a scale beam and for supporting the unbalanced lever against free motion and in such manner that the force of the unbalanced lever on the ladder is exerted in the direction of the load being weighed, and a fixed stop in the path of movement of the lever and positioned to limit the range of free movement thereof during the weighing operation to an extent less than the movement of the ladder whereby after predetermined deflection of the scale beam the lever is held by said stop from further movement, said stop having a mercury well thereon, the lever having a contact which enters the mercury in said well when the lever engages said stop, said attachment being so positioned with respect to the scale beam to which it is applied that the distance from the ladder to the fulcrum of the scale beam is greater than the distance from the ladder to the pivot point of the unbalanced lever, whereby the lever and scale beam move at different angular velocities.

3. An attachment for a scale beam comprising a fixed supporting structure, an unbalanced lever pivotally carried on said structure, a ladder for pivotal attachment to one end to a scale beam and for supporting the unbalanced lever against free motion and in such manner that the force of the unbalanced lever on the ladder is exerted in the direction of the load being weighed, and a fixed stop in the path of movement of the lever and positioned to limit the range of free movement thereof during the weighing operation to an extent less than the movement of the ladder whereby after predetermined deflection of the scale beam the lever is held by said stop from further movement, said lever having an adjustable counterweight thereon, whereby to vary the force exerted by it on the ladder, said attachment being so positioned with respect to the scale beam to which it is applied that the distance from the ladder to the fulcrum of the scale beam is greater than the distance from the ladder to the pivot point of the unbalanced lever, whereby the lever and scale beam move at different angular velocities.

4. An attachment for a scale beam comprising a fixed supporting structure, an unbalanced lever pivotally carried on said structure, a ladder for pivotal attachment at one end to a scale beam and for supporting the unbalanced lever against free motion and in such manner that the force of the unbalanced lever on the ladder is exerted in the direction of the load being weighed, a fixed stop on the supporting structure in the path of movement of the lever and positioned to limit the range of free movement thereof during the weighing operation to an extent less than the movement of the ladder whereby after predetermined deflection of the scale beam the lever is held by said stop from further movement, said lever having an adjustable counterweight thereon, and means for adjustably elevating the center of gravity of the lever to vary the instability of the lever.

5. An attachment for scale beams comprising a fixed supporting structure, a plurality of unbalanced levers pivotally carried in the supporting structure and biased to move in the same direction, a plurality of fixed stop elements in the path of movement of said levers to limit the extent of movement thereof, and a ladder member pivotally attached to the scale beam for holding said levers out of contact with their respective stop elements until there has been a predetermined deflection of the scale beam, the position of the stop elements with respect to their levers being differently adjusted whereby the levers contact the stop elements in a predetermined succession according to the deflection of the scale beam, said levers exerting a load on the scale beam which is in the same direction as the load of the material being weighed until they are engaged with their respective stops.

6. An attachment for scale beams comprising a fixed supporting structure, a plurality of unbalanced levers pivotally carried in the supporting structure and biased to move in the same direction, a plurality of fixed stop elements in the path of movement of said levers to limit the extent of movement thereof, a ladder member pivotally attached to the scale beam for holding said levers out of contact with their respective stop elements until there has been a predetermined deflection of the scale beam, the position of the stop elements with respect to their levers being differently adjusted whereby the levers contact the stop elements in a predetermined succession according to the deflection of the scale beam, and an indicator operatively connected with the ladder, said levers exerting a load on the scale beam which is in the same direction as the load of material being weighed until said levers are engaged with their respective stops.

7. An attachment for scale beams comprising a fixed supporting structure, a plurality of unbalanced levers pivotally carried in the supporting structure and biased to move in the same direction, a plurality of fixed stop elements in the path of movement of said levers to limit the extent of movement thereof, a ladder member pivotally attached to the scale beam for holding said levers out of contact with their respective stop elements until there has been a predetermined deflection of the scale beam, the position of the stop elements with respect to their levers being differently adjusted whereby the levers contact the stop elements in a predetermined succession according to the deflection of the scale beam, said levers exerting a load on the scale beam which is in the same direction as the load of the material being weighed until said levers are engaged with their respective stops and means for adjusting the supporting structure relatively to the scale.

8. An attachment for weighing devices in which the weighing device has a member which is deflected by the material being weighed, said attachment comprising a plurality of elements biased to move in the same direction, means connected with the deflecting member of the weighing device for transmitting the force exerted by said elements to the said member in the same direction as said member is deflected by the load being weighed, and fixed stop elements in the path of the movable elements to limit the range of movement of the movable elements, whereby the force exerted by the movable elements is removed from the weighing member when the movable elements come to rest against their respective stops, said stops and movable elements being variously positioned relative to said first-named means so that different movable elements engage their respective stops in a predetermined succession in the movement of the deflectable weighing member whereby the equilibrium of the weighing device is momentarily disturbed each time one of said elements engages its respective stop, whereby the deflection of said deflectable member is momentarily halted.

9. An indicating attachment for weighing scales comprising a beam having an indicator attached thereto, a ladder attached to a load deflected element of a scale and connected with the beam, the connection between the load deflected element of the scale and the beam which is provided through the ladder being arranged to amplify the movement of the load deflected element an unbalanced beam engaging the ladder, and a fixed stop in the path of movement of the unbalanced beam to limit the range of movement of said unbalanced beam to a distance less than the range of movement of the ladder for causing the unbalanced lever to halt in its movement at an intermediate position in the operation of weighing, the ladder and unbalanced beam being connected with the load deflected element to exert a force on the load deflected element in the same direction as the load being weighed.

10. Means for indicating an intermediate station in the movement of the scale beam, said means comprising an unbalanced lever of short length as compared to the scale beam, a ladder on the scale beam through which the force of the unbalanced lever is exerted upon the scale beam in the direction of the load of the material being weighed, a stop in the path of movement of the unbalancing beam to limit the arc through which said beam may exert force on the scale beam to an intermediate point in the travel of said beam, said unbalanced beam and ladder being connected to the scale beam at points where a small deflection of the scale beam permits a relatively larger angular movement of the unbalanced beam.

WILLIAM H. VENABLE.